(12) United States Patent
Lederman et al.

(10) Patent No.: US 10,839,408 B2
(45) Date of Patent: Nov. 17, 2020

(54) MARKET EVENT IDENTIFICATION BASED ON LATENT RESPONSE TO MARKET EVENTS

(71) Applicant: International Business Machines Corporation, Armonk, NY (US)

(72) Inventors: Roger Douglas Lederman, Braircliff Manor, NY (US); Herbert Scott McFaddin, Yorktown Heights, NY (US); Chandrasekhar Narayanaswami, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 15/282,629

(22) Filed: Sep. 30, 2016

(65) Prior Publication Data
US 2018/0096368 A1    Apr. 5, 2018

(51) Int. Cl.
G06Q 30/02  (2012.01)
G06Q 10/06  (2012.01)

(52) U.S. Cl.
CPC ....... *G06Q 30/0202* (2013.01); *G06Q 10/067* (2013.01)

(58) Field of Classification Search
CPC .................................................... G06Q 30/02
See application file for complete search history.

(56) References Cited

U.S. PATENT DOCUMENTS

| | | | |
|---|---|---|---|
| 8,046,273 B2 | 10/2011 | Welter et al. | |
| 8,554,641 B2 | 10/2013 | Mohan | |
| 2007/0203773 A1 | 8/2007 | Milne | |
| 2011/0191141 A1 | 8/2011 | Thompson et al. | |
| 2012/0290357 A1 | 11/2012 | Hamlisch | |
| 2013/0191195 A1 | 7/2013 | Carlson et al. | |
| 2013/0297543 A1* | 11/2013 | Treiser | G06Q 30/02 706/45 |
| 2013/0342538 A1 | 12/2013 | Kozine | |
| 2014/0012628 A1 | 1/2014 | Hsieh | |
| 2014/0040023 A1* | 2/2014 | Mohan | G06Q 30/02 705/14.49 |
| 2014/0067472 A1 | 3/2014 | Mayes | |
| 2014/0164171 A1 | 6/2014 | Lu | |
| 2014/0222506 A1* | 8/2014 | Frazer | G06Q 30/02 705/7.29 |
| 2014/0278990 A1 | 9/2014 | Swanson | |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Kurtis Gills
(74) *Attorney, Agent, or Firm* — Joseph Petrokaitis, Esq.; McGinn IP Law Group, PLLC

(57) ABSTRACT

A market event identification method, system, and computer program product, include defining a likelihood function that maps a likelihood of a purchase of a product during an event by customers having similar customer features and estimating a likelihood of an event-driven purchase by the customers for each of a plurality of product-event combinations using the defined likelihood function.

8 Claims, 6 Drawing Sheets

(56) References Cited

U.S. PATENT DOCUMENTS

| | | | |
|---|---|---|---|
| 2014/0279868 A1* | 9/2014 | Astorg | G06F 16/22 707/609 |
| 2015/0032502 A1 | 1/2015 | Green et al. | |
| 2015/0106867 A1 | 4/2015 | Liang | |
| 2015/0287052 A1 | 10/2015 | Li | |
| 2015/0317589 A1 | 11/2015 | Anderson et al. | |
| 2015/0348057 A1 | 12/2015 | Parpia | |
| 2016/0063419 A1 | 3/2016 | Martinez et al. | |
| 2016/0171540 A1 | 6/2016 | Mangipudi et al. | |
| 2016/0275413 A1 | 9/2016 | Shi et al. | |
| 2017/0235848 A1 | 8/2017 | Van Dusen et al. | |
| 2017/0278053 A1 | 9/2017 | High et al. | |
| 2017/0316438 A1 | 11/2017 | Konig et al. | |
| 2018/0053199 A1 | 2/2018 | Mathis et al. | |
| 2018/0285682 A1 | 10/2018 | Najibi et al. | |

OTHER PUBLICATIONS

United States Office Action dated Feb. 19, 2019, in co-pending U.S. Appl. No. 15/282,637.
United States Office Action dated Feb. 19, 2019, in co-pending U.S. Appl. No. 15/282,703.
United States Office Action dated Oct. 15, 2019, in co-pending U.S. Appl. No. 15/282,637.
United States Office Action dated Jul. 2, 2019, in co-pending U.S. Appl. No. 15/282,703.
United States Office Action dated Dec. 31, 2019, in co-pending U.S. Appl. No. 15/282,637.
United States Office Action dated Apr. 1, 2020, in co-pending U.S. Appl. No. 15/282,637.
United States Office Action dated Mar. 19, 2019, in co-pending U.S. Appl. No. 15/282,703.
United States Office Action dated Jul. 21, 2020, in co-pending U.S. Appl. No. 15/282,703.
United States Office Action dated Aug. 12, 2020, in co-pending U.S. Appl. No. 15/282,703.
United States Office Action dated Sep. 9, 2020, in co-pending U.S. Appl. No. 15/282,637.
Capistran, Carlos, and Allan Timmermann. "Forecast combination with entry and exit of experts." Journal of Business & Economic Statistics 27.4 (2009): 428-440. (Year: 2009).
Trapero, Juan R., Nikolaos Kourentzes, and Robert Fildes. "On the identification of sales forecasting models in the presence of promotions." Journal of the operational Research Society 66.2 (2015): 299-307. (Year: 2015).
Ali, Ozden Gur, et al. Pooling information across SKUs for demand forecasting with data mining. working paper, 2007. (Year: 2007).

\* cited by examiner

MARKET EVENT IDENTIFICATION BASED ON LATENT RESPONSE TO MARKET EVENTS

CROSS REFERENCE TO RELATED APPLICATIONS

The present application is a related application of co-pending U.S. patent application Ser. No. 15/282,637, and U.S. patent application Ser. No. 15/282,703, each of which was filed on Sep. 30, 2016, the entire contents of which are incorporated herein by reference.

BACKGROUND

The present invention relates generally to a market event identification method, and more particularly, but not by way of limitation, to a system, method, and computer program product for grouping retail/grocery products to which customers exhibit similar patterns of response.

Conventionally, event-based purchasing is unobservable. Conventional techniques can observe that a product was purchased during the window of a specific event (e.g., a holiday, a major sporting event, etc.), but cannot conclude a priori that the event is driving the purchase. Also, some conventional techniques have considered measuring product responses according to an impact of promotions on specific products. The techniques do not pull out groups of products with related response patterns. Other techniques consider recommending products based on context, such as events. However, these techniques do not detect event-product relationships from history.

SUMMARY

In an exemplary embodiment, the present invention can provide a computer-implemented market event identification method, the method includes defining a likelihood function that maps a likelihood of a purchase of a product during an event by customers having similar customer features and estimating a likelihood of an event-driven purchase by the customers for each of a plurality of product-event combinations using the defined likelihood function.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
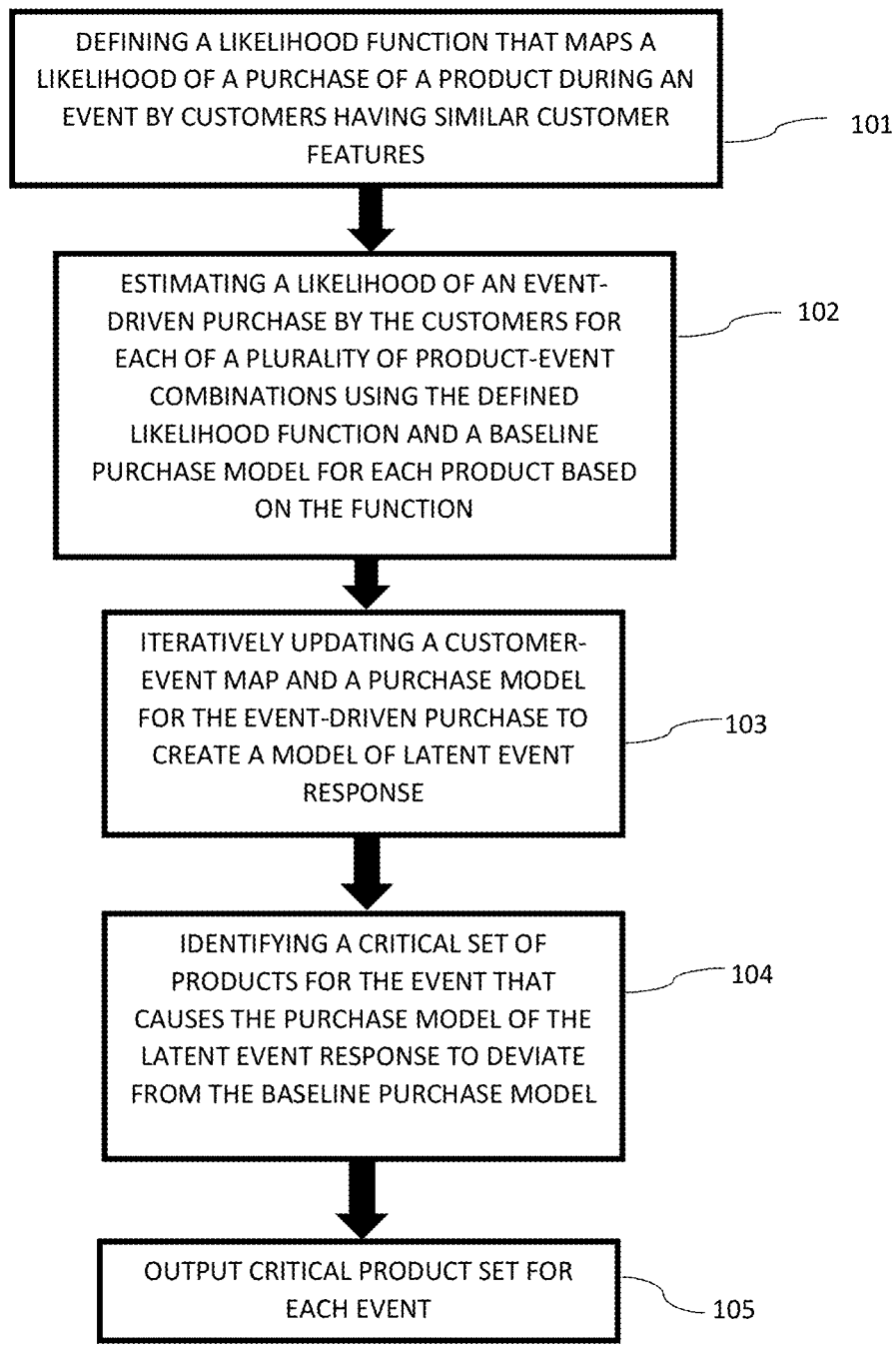
FIG. 1 exemplarily shows a high-level flow chart for a market event identification method 100.

The invention will now be described with reference to FIG. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the market event identification method 100 includes various steps to determine which purchases are event-related, and which are not, by identifying the set of products whose purchase patterns best distinguish between these types of behavior. As shown in at least FIG. 5, one or more computers of a computer system 12 according to an embodiment of the present invention can include a memory 28 having instructions stored in a storage system to perform the steps of FIG. 1.

Thus, the market event identification method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 5-7) may be implemented in a cloud environment 50 (see e.g., FIG. 6), it is nonetheless understood that the present invention can be implemented outside of the cloud environment.

Steps 101 to 105 determine event-driven customer behavior in two stages. To realize a purchase of product j that "results" from event k, a customer i first must be identified as part of the event k customer segment (the likelihood of which is denoted as $M_{ik}$), and second is to decide to include product j in a purchase basket for event k (the likelihood of which is denoted as $P_{kj}$). With this model, the likelihood of purchasing product j for event k is $M_{ik}P_{kj}$.

For product selection, $P_{kj}$ is to be determined (i.e. identify the set of products that are purchased in connection with the event). If customer segmentation is known in advance, then the embodiment can estimate $P_{kj}$ from the purchasing of customers that are known to respond to event k.

To identify event-based purchasing, groups of customers are examined that show similar purchase behavior across time windows corresponding to a number of related events. That is, in step 101, a likelihood function is defined that maps a likelihood of a purchase of a product during an event by customers having similar customer features.

Characteristic features (i.e., customer features) can include demographic information as well as features constructed from purchasing history. Examples of demographic information are age, gender, income, education level, household size, etc. If not obtained for individuals, then address can be used to map to a census block. These and other census statistics are available at that level.

Examples of constructed features include share of historical purchases by product category, share of historical purchases by day of week and time of day, historical shopping frequency, historical basket size, and price preference.

In step 102, a likelihood of event-driven purchasing for each product-event combination and a baseline purchase model for each product (e.g., as exemplarily depicted in FIG. 4) is estimated. That is, for product selection, the quantity $P_{kj}$, which determines the likelihood that a customer purchasing for event k will purchase product j, is estimated. In some embodiments, this can be estimated by taking frequency counts or using standard choice modeling approaches. In a preferred embodiment, the problem is complicated by the inability to directly observe event impacts and thus it is assumed that the ability to compute a customer-event matrix $Q_{ik}$, such that $Q_{ik}=1$ when customer i responds to event k and $Q_{ik}=0$ otherwise. The likelihood of purchase of product j during event k for an event k customer is represented by a choice model (1):

$$P_{kj}(v) = \frac{e^{v_{kj}}}{1 + e^{v_{kj}}}. \quad (1)$$

Then, v is obtained, and the product selection, by maximizing the likelihood function (2):

$$L(v) = \prod_t \prod_{k \in K_t} \prod_{i:Q_{ik}=1} \prod_j [P_{kj}(v)]^{y_{ijt}} [1 - P_{kj}(v)]^{(1-y_{ijt})} \quad (2)$$

Figure 2:
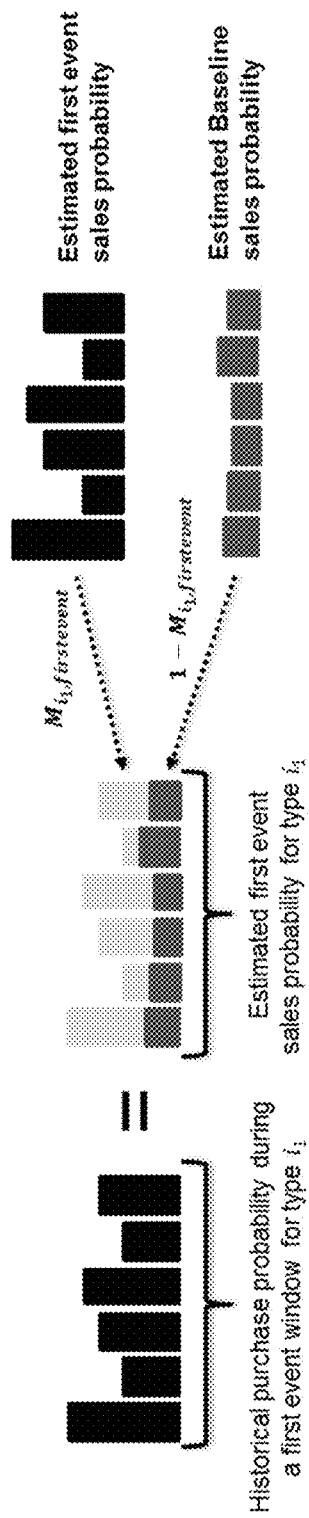
FIG. 2 exemplarily depicts latent event-membership variables of the market event identification method 100.

For example, as shown in FIG. 2, the historical purchase probability during a first event window for type ii is used to subtract the estimated baseline sales probability (e.g., the sales for the product under normal conditions) to determine the estimated first event sales probability (e.g., the likelihood of the event-driven purchase).

In step 103, the customer-event map and the purchase model are iteratively updated to create a model of a latent event response by estimating both $M_{ikt}$ and $P_{kj}$ (quantity) simultaneously.

In this case, α and v are estimated jointly to maximize the likelihood function:

$$L(\alpha, v) = \prod_i \prod_t \sum_{k \in K_t} M_{ikt}(\alpha) \prod_j [P_{kj}(v)]^{y_{ijt}} [1 - P_{kj}(v)]^{(1-y_{ijt})} \quad (3)$$

Figure 3:
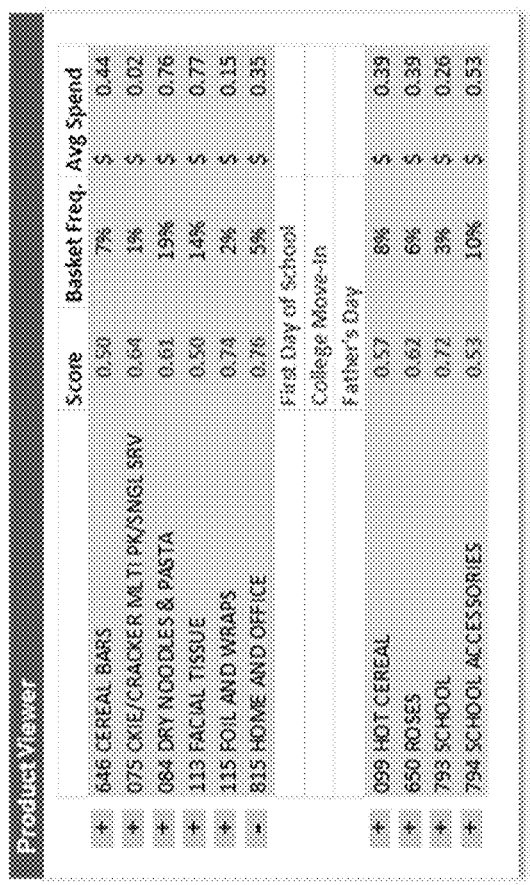
FIG. 3 exemplarily depicts an output of a critical product set.

The likelihood function (3) is an expectation-maximization approach that alternates between computation of a and v parameters. The expectation step takes v as given, and computes the expectation of $M_{ikt}$, conditional on v and y. The maximization step then takes the latest values of $M_{ikt}$, and solves for v while holding this fixed. Both sub-problems can be solved efficiently, and iteration can be done between them until reaching convergence. FIG. 3 exemplarily depicts a likelihood output of the event driven purchasing based on the model.

It is noted that customers i∈I, products j∈J, and events k∈K, event category c⊆K (with $c_k$ denoting a (unique) category containing k), time periods t∈T (with $K_t \subseteq K$ denote the set of events occurring during t), a customer characteristic vector $w_i$, and a purchase indicator: $y_{ijt}$.

Figure 4:
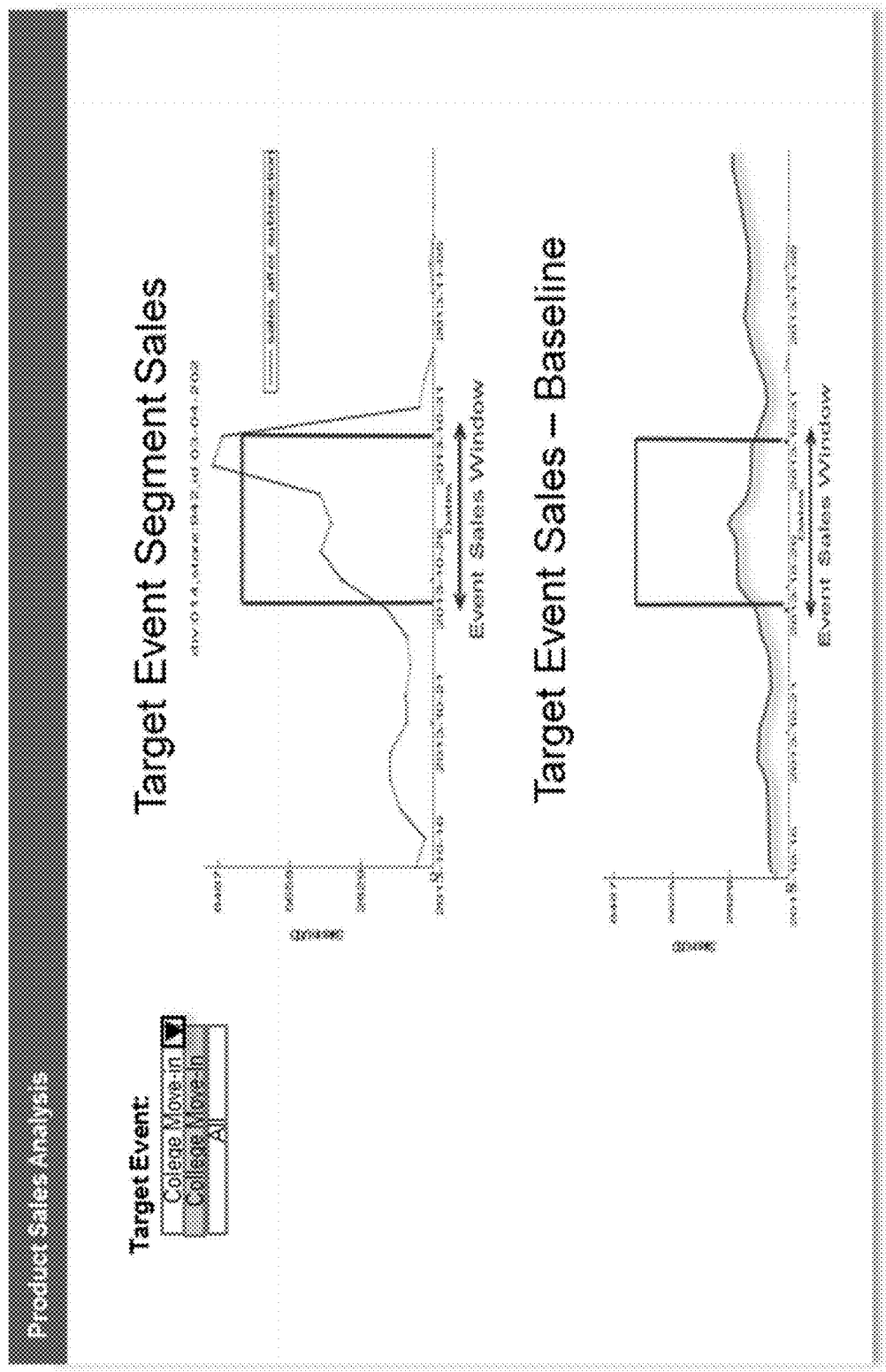
FIG. 4 exemplarily depicts a baseline purchase model and a critical product set deviating from the baseline purchase model.

In step 104, a critical set of products is identified for the event that causes the purchase model of the latent event response to deviate from the baseline purchase model. That is, products that deviate from the estimated baseline purchasing model in step 102 for a segment of clustered customers (e.g., customers with similar features) are identified such as shown in FIG. 4.

In step 105, the critical product set for each event is output. FIG. 3 exemplarily depicts a product set output for the first day of school, a college move-in day, and Father's Day.

Thus, products whose purchase is associated with a specific event, e.g. a holiday, a local gathering, etc. are identified. In a preferred embodiment, the method 100 operates in a setting where the product set to target for an event is not known a priori, and a customer's purchase motive (whether or not the purchase is event-driven) cannot be observed directly. That is, the method 100 models a likelihood that a specific type of event influences a purchase as a latent variable. The latent variables are used to isolate the set of products that show the clearest distinction between event-based and baseline sales patterns (e.g., as exemplarily shown in FIG. 4). In this model, the likelihood of purchase for a particular product by a customer during the window of an event can be expressed as a, possibly latent, mixture of the model-based purchase likelihoods for event-driven and baseline purchasing. This is solved jointly over mixture and purchase likelihood parameters to find the most likely overall set of parameters. This can be done using an Expectation-Maximization algorithm, Markov Chain Monte Carlo algorithm, or other heuristic solution approaches. Once the parameters have been solved, the event-driven purchase parameters are used to determine the set of relevant products for upcoming events.

Thus, the inventors have considered the technical solution to the technical problem in the conventional techniques of solving for causation in product purchase trends by identifying a set of products that are purchased in connection with the event. If customer segmentation is known in advance, the embodiment can estimate $P_{kj}$ from the purchasing of customers that are known to respond to event k.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
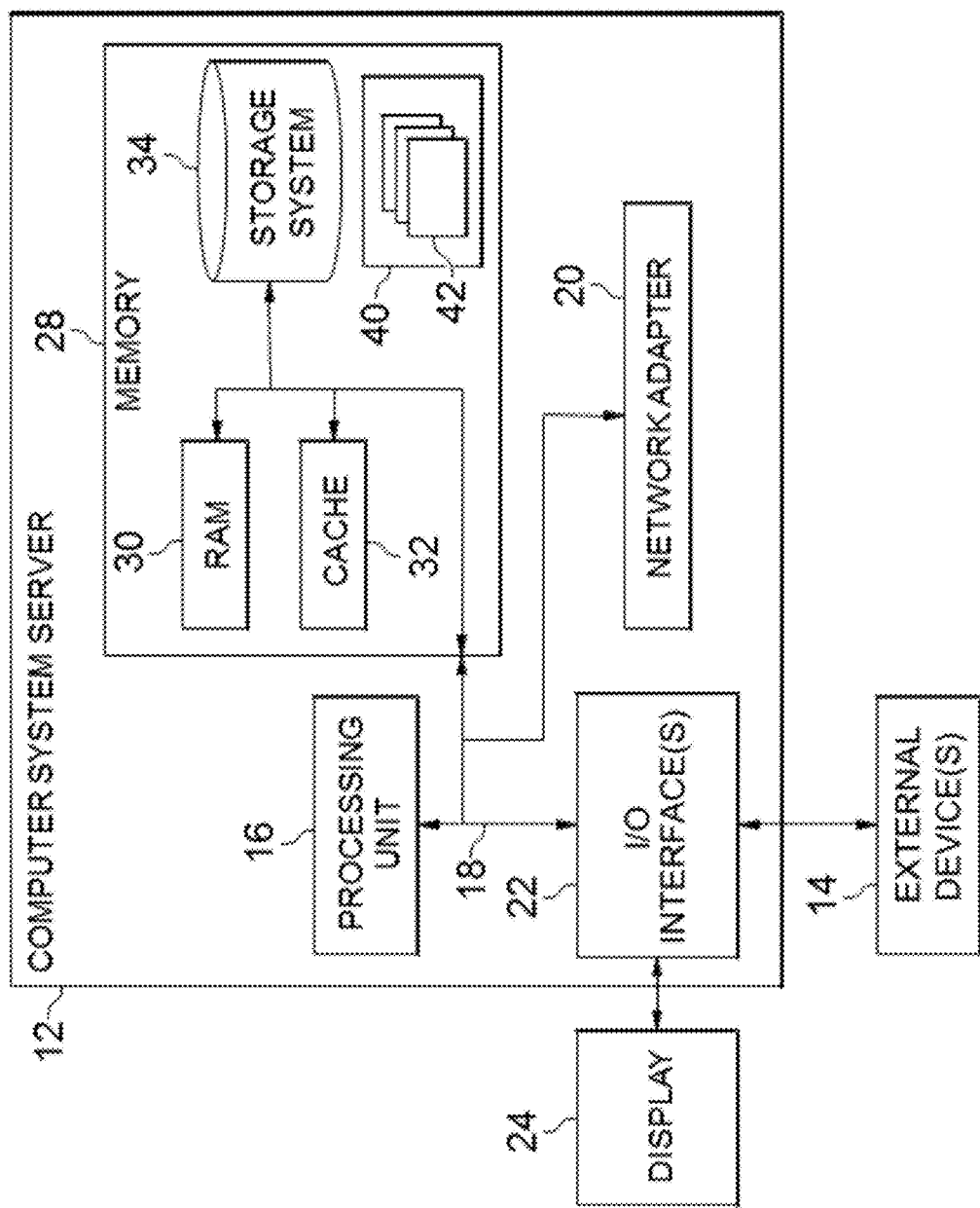
FIG. 5 depicts a cloud computing node 10 according to an embodiment of the present invention.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 5, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
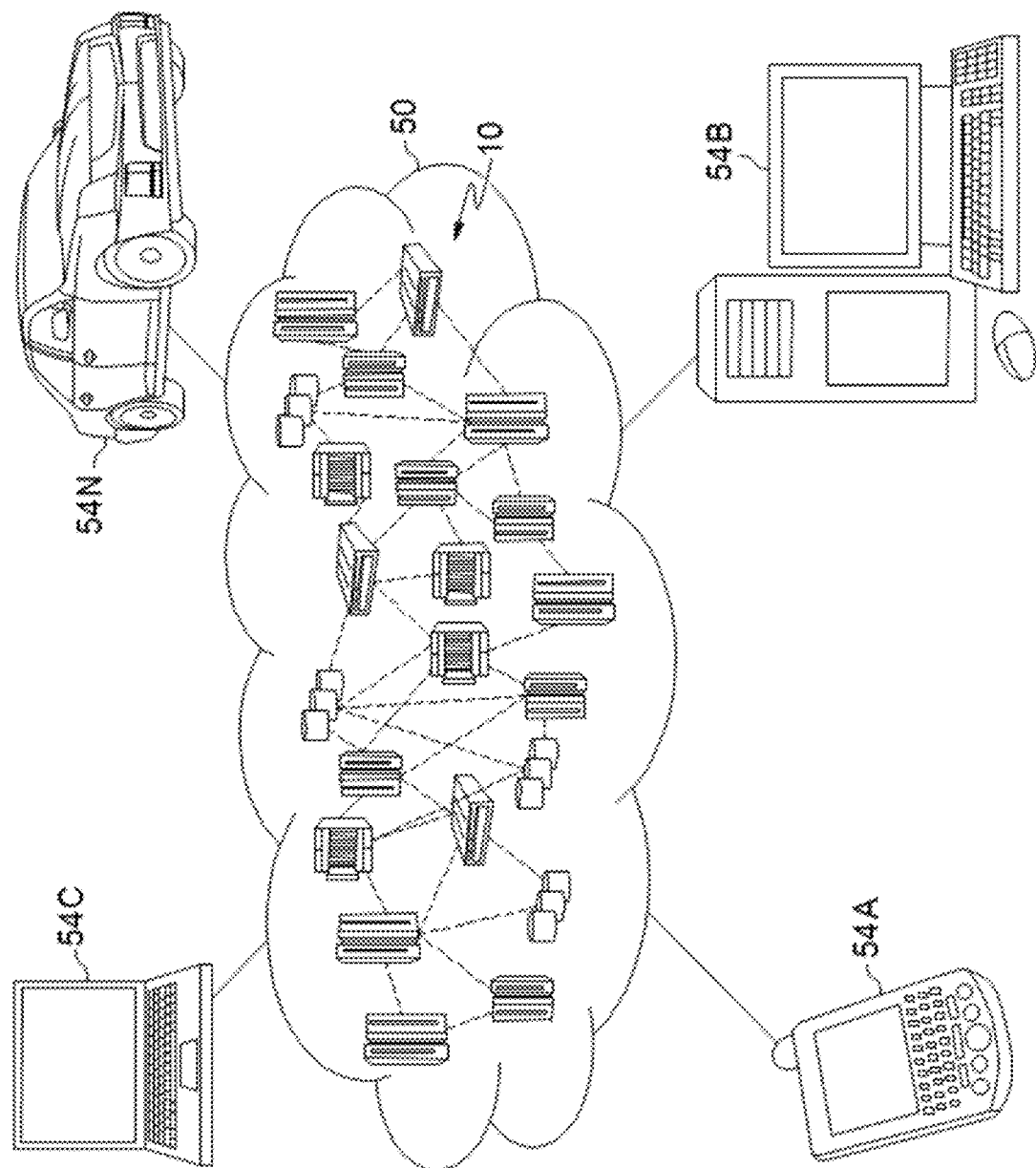
FIG. 6 depicts a cloud computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
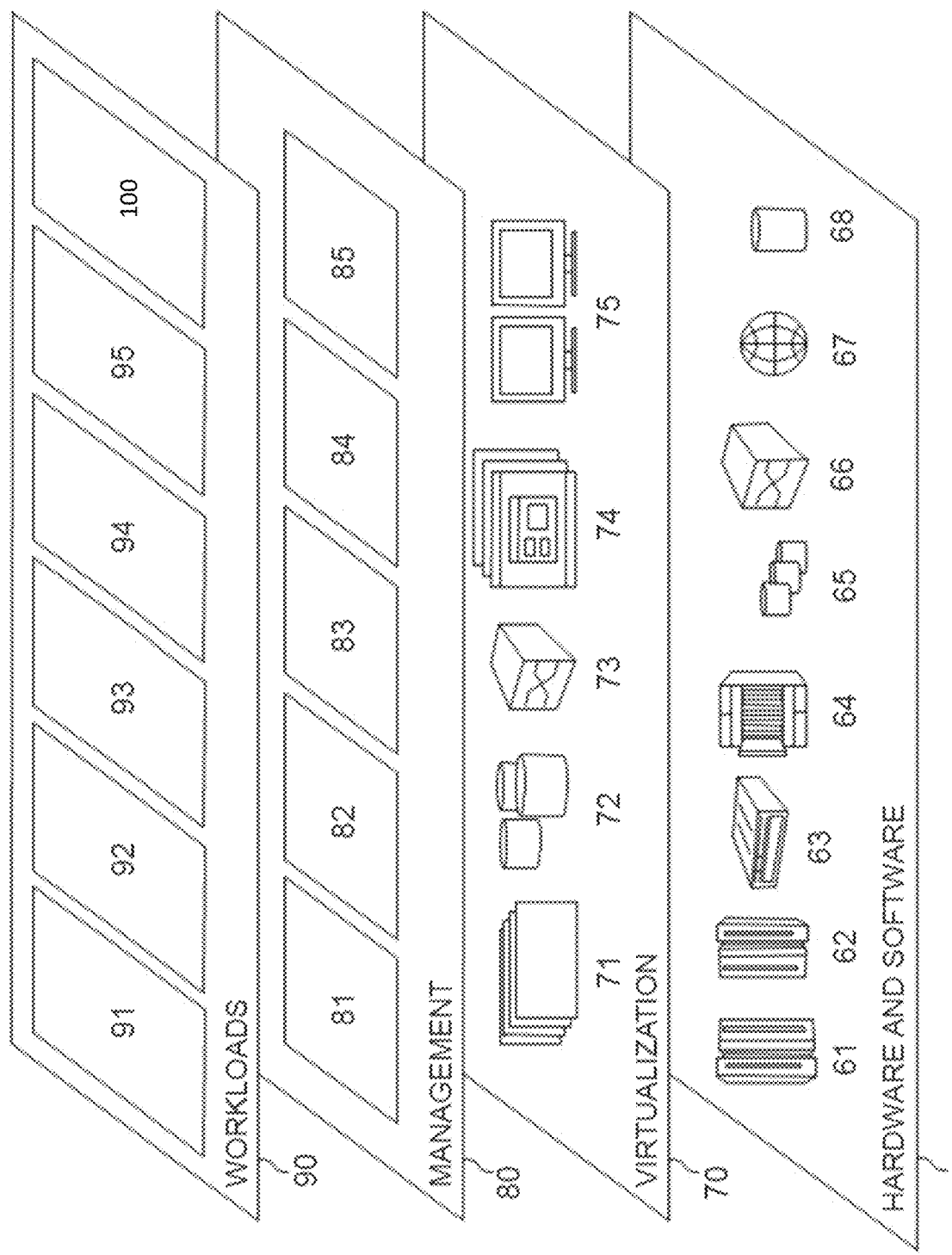
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the market event identification method 100.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented market event identification method, the method comprising:
    defining a likelihood function that maps a likelihood of a purchase of a product during an event by customers having similar customer features, the function including a variable that factors event-product relationships;
    estimating a likelihood of an event-driven purchase by the customers for each of a plurality of product-event combinations using the defined likelihood function,
    wherein the likelihood function comprises an expectation-maximization approach that alternates between computations of a first parameter and a second parameter where:
        the likelihood function takes the first parameter and the second parameter as given, and computes the expectation of the likelihood of the purchase of the product during the event conditional on the first parameter and the second parameter; and
        a maximization is performed by taking latest values of the likelihood of the purchase of the product during the event, and solves for the first parameter and the second parameter while holding fixed the latest values,
    further comprising identifying a critical set of products using the likelihood function for the event that causes a purchase model of a latent event response to deviate from a baseline purchase model,
    wherein the likelihood of the event-driven purchase is estimated by maximizing the likelihood function,
    further comprising iteratively updating a customer-event map and a purchase model for the event-driven purchase to create a model of latent event response.

2. A computer program product for market event identification, the computer program product comprising a non-transitory computer-readable storage medium having program instructions embodied therewith, the program instructions executable by a computer to cause the computer to perform:
    defining a likelihood function that maps a likelihood of a purchase of a product during an event by customers having similar customer features, the function including a variable that factors event-product relationships;
    estimating a likelihood of an event-driven purchase by the customers for each of a plurality of product-event combinations using the defined likelihood function,
    wherein the likelihood function comprises an expectation-maximization approach that alternates between computations of a first parameter and a second parameter where:
        the likelihood function takes the first parameter and the second parameter as given, and computes the expectation of the likelihood of the purchase of the product during the event conditional on the first parameter and the second parameter; and
        a maximization is performed by taking latest values of the likelihood of the purchase of the product during the event, and solves for the first parameter and the second parameter while holding fixed the latest values,
    further comprising identifying a critical set of products using the likelihood, function for the event that causes a purchase model of a latent event response to deviate from a baseline purchase model.

3. The computer program product of claim 2, wherein the likelihood of the event-driven purchase is estimated by maximizing the likelihood function.

4. The computer program product of claim 2, further comprising iteratively updating a customer-event map and a purchase model for the event-driven purchase to create a model of latent event response.

5. The computer program product of claim 2, further comprising iteratively updating a customer-event map and the purchase model for the event-driven purchase to create a model of latent event response.

6. A market event identification system, said system comprising:
    a processor; and
    a memory, the memory storing instructions to cause the processor to perform:
        defining a likelihood function that maps a likelihood of a purchase of a product during an event by customers having similar customer features, the function including a variable that factors event-product relationships;
        estimating a likelihood of an event-driven purchase by the customers for each of a plurality of product-event combinations using the defined likelihood function,
        wherein the likelihood function comprises an expectation-maximization approach that alternates between computations of a first parameter and a second parameter where:
            the likelihood function takes the first parameter and the second parameter as given, and computes the expectation of the likelihood of the purchase of the product during the event conditional on the first parameter and the second parameter; and
            a maximization is performed by taking latest values of the likelihood of the purchase of the product during the event, and solves for the first parameter and the second parameter while holding fixed the latest values,
        further comprising identifying a critical set of products using the likelihood function for the event that causes a purchase model of a latent event response to deviate from a baseline purchase model.

7. The system of claim 6, wherein the likelihood of the event-driven purchase is estimated by maximizing the likelihood function.

8. The system of claim 6, embodied in a cloud-computing environment.

* * * * *